United States Patent [19]

Bovet

[11] 4,256,195
[45] Mar. 17, 1981

[54] WRITING AND WEIGHING INSTRUMENTS

[75] Inventor: Thomas Bovet, Hong Kong, Hong Kong

[73] Assignee: Uptrend Products Ltd., Hong Kong

[21] Appl. No.: 22,568

[22] Filed: Mar. 22, 1979

[30] Foreign Application Priority Data

Apr. 6, 1978 [GB] United Kingdom ............ 13566/78

[51] Int. Cl.³ .................. G01G 3/02; B43K 29/00
[52] U.S. Cl. .................................. 177/232; 177/245; 401/195
[58] Field of Search .............. 401/195; 177/129, 232, 177/245

[56] References Cited

U.S. PATENT DOCUMENTS

| 698,370 | 4/1902 | Burrow | 177/232 |
|---|---|---|---|
| 2,097,837 | 11/1937 | Kaplan | 177/232 |
| 2,129,469 | 9/1938 | Hedges | 177/232 |
| 2,690,927 | 10/1954 | Bean | 177/245 |

FOREIGN PATENT DOCUMENTS

| 22692 | 7/1883 | Fed. Rep. of Germany | 177/245 |
|---|---|---|---|
| 422838 | 3/1911 | France | 177/245 |
| 877273 | 9/1961 | United Kingdom . | |

*Primary Examiner*—Robert W. Michell
*Assistant Examiner*—J. L. Kruter
*Attorney, Agent, or Firm*—Townsend and Townsend

[57] ABSTRACT

A writing instrument which will function both for writing and for weighing small items such as letters. The instrument has a tubular body housing a member slidable within it and can slide in and out of one end. The slidable member carries a writing tip such as a nib, lead or ball point. The other end of the tubular body is closed by a plug which carries a letter holding clamp and a spring is provided between the plug and the slidable member.

3 Claims, 2 Drawing Figures

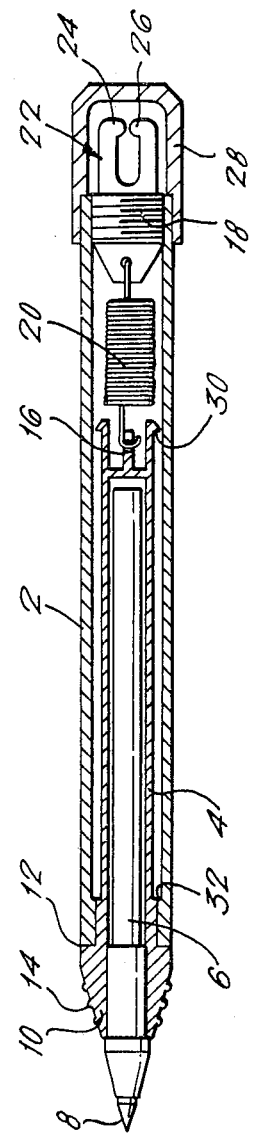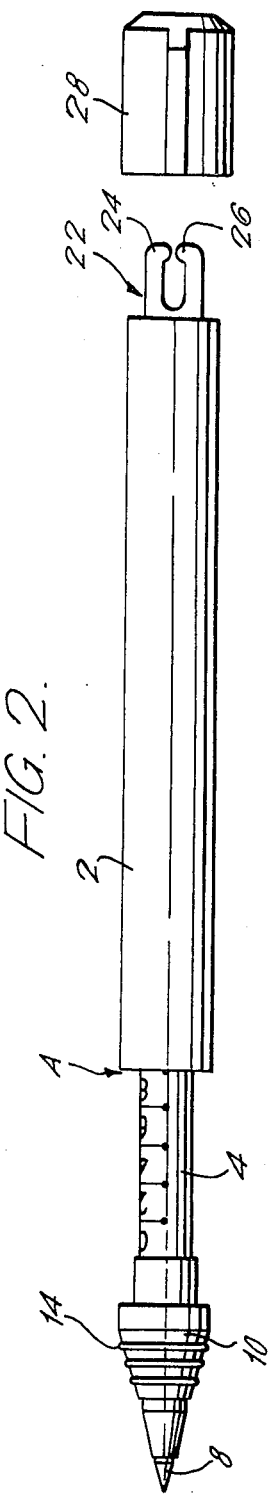

WRITING AND WEIGHING INSTRUMENTS

This invention relates to writing instruments such as pens, ball point pens, pencils and the like and it also relates to weighing devices for letters, small packets or the like.

BRIEF SUMMARY OF THE INVENTION

A writing instrument in accordance with this invention comprises a tubular body which is open at both ends and which houses a member which passes through one open end and is free to slide in and out of the body through the said end which member, carries, or incorporates a writing tip, e.g. a pen nib, ball point, lead or the like for the instrument, which tip is positioned to project from the body when the member is fully housed in the said body, the other end of the tubular body being closed by a plug carrying a letter (or the like) holding unit adapted to receive and grip letters, packets or the like, the inner end of the sliding member being secured to a fixed part of the body and/or the plug by a resiliently extensible member such as a spring or its equivalent.

Such an instrument can normally be used for writing but when it is desired to weigh a letter so as, for example, to be able to ascertain the correct stamps to be used on the letter, the letter is gripped by the holding unit and the projecting end portion of the sliding member is then held, allowing the body and the letter to be suspended from the said member through the spring.

The body of the member carries markings, which can be read off against the end of the tubular body or against a scale pointer, so as to gain an indication of the weight of the letter, in accordance with the extent of projection of the sliding member from the body.

When the instrument is not being used as a weighing device the spring will act to bias the sliding member to a position within the body so that the instrument can be used for writing.

The gripping unit is preferably provided with a removable cap so as to give the instrument a more attractive appearance and so as to help to prevent damage to the member.

The gripping unit is preferably a U-shaped member made of resilient plastics material, the two arms of which have their free ends positioned away from the body turned inwardly to face each other and so arranged and positioned as normally to contact each other with an approximate point or line contact. A letter pushed between the arms, is then gripped by the inturned ends thereof to hold the letter during the weighing operation.

The plug member may be attached to the body by a screw thread, rotation of the plug relative to the body then acting to adjust the tension of the spring and thus provide a ready means for adjustment of the weighing device to achieve proper calibration.

BRIEF DESCRIPTION OF THE DRAWINGS

The invention will now be further described, by way of example, with reference to the accompanying drawings, in which:

FIG. 1 is a section through one embodiment of writing instrument in accordance with the invention shown in a position in which the instrument is to be used for writing; and FIG. 2 is an exploded view of the instrument shown in FIG. 1 showing it in a position as used as a weighing device.

DESCRIPTION OF THE PREFERRED EMBODIMENT

Referring to FIG. 1 the writing instrument comprises a tubular body 2 open at both ends and housing a cylindrical member 4 which in turn carries a writing device 6 having an operative writing tip 8.

The outer end portion 10 of the member 4 is provided with a shoulder 12 which abuts the end of the body 2, when in a position in which the major portion of the member 4 is fully housed within the body so as to limit the inward movement of the member. The inner cylindrical part of the end portion 10 is made of an appropriate diameter so as to be a push fit within the open end of the tubular body 2. This portion 10 is provided with ribs 14 to enable a user readily to grip the member.

The inner end 16 of the sliding member 4 is secured to a plug 18 which is screw-threadedly engaged in the other end of the body, through a 'rate' spring 20 which biasses the member 4 to the position shown in FIG. 1 in which it is housed to its maximum extent, within the body. The spring 20 is in a relaxed condition when the outer end portion 10 is in its fully inserted position within the body 2 as shown in FIG. 1.

The plug 18 carries a letter or packet holding unit 22 which projects out from the body and comprises a U-shaped member, the free end of the two arms of which are positioned away from the body and have inturned ends 24 and 26. The device is made of resilient plastics material and the two ends 24 and 26 are urged towards each other to touch as shown in FIG. 1.

The device 22 is normally covered by a removable cap 28 which is a push fit over the end of the body 2. The inner end of the member 4 is formed with cylindrical barbs 30 which can be sprung radially inwardly to enable the member 4 to be inserted through the open end of the body 2. When the barb members have passed a shoulder 32 adjacent the open end they spring out inwardly and then act to retain the member 4 within the body. Thus if a heavy weight is being gripped by the ends 24 and 26 then the body 2 slides over the member 4 to a position in which the barbs 30 abut the shoulder 32. Further outward movement of the member 4 is then prevented which prevents damage to the spring 20.

In the position shown in FIG. 1 the instrument can be used as a normal writing instrument.

The outer surface of the inner cylindrical part of the member 4 is provided with markings forming an appropriate scale for example 0 to 20 to provide an indication of the weight of a letter, packet or the like which is to be weighed using the instrument as a weighing device.

When a weighing operation is to be carried out the cap 28 is removed and a letter in an envelope or the like packet, pushed between the ends 24 and 26 of the device 22, the two arms acting on opposite sides of the letter and gripping the letter due to the resilience of the plastics material. The instrument is then held in a vertical position with a user gripping the tip portion 10 and with the letter and the securing unit 22 hanging freely downwardly.

In this position the body 2 slides down over the member 4, as illustrated in FIG. 2, to a position which is determined by the relative weight of the letter and the strength of the spring 20. When a balance position is reached, a user can read off an indication of the weight of the letter from the scale on the outer surface of the member 4, opposite the outer end of the body 2 as indicated by the arrow A in FIG. 2. He will then be able to ascertain the correct value of stamps to be used on the letter.

It will be appreciated that an instrument in accordance with the invention comprises a very effective means of combining in one unit, an instrument which can be used for example to write a letter and a device for weighing the letter and envelope ready for posting.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A writing and weighing instrument comprising:
an outer tubular body having first and second ends which are open, said body having an inwardly directed flange at said first open end;
an inner member having an enlarged outer end portion disposed external of said body and configured for abutment with said first end of said body, an intermediate sleeve adjacent said outer end portion in a push-fit relationship within said body at said first end thereof; a narrower sleeve adjacent to said intermediate sleeve slidable axially within said tubular body and said flange, and outwardly projecting abutment means at the outer end of said narrower sleeve adapted for engagement with said flange to prevent complete withdrawal of said inner member from said outer tubular body;
a writing instrument housed within said inner member, said instrument having a tip projecting outwardly from said outer end portion, whereby said instrument can be used for writing when said intermediate sleeve is engaged within said first end of said body;
a plug fitting within and closing said second end of said tubular body, means being provided for adjustably securing said plug within said second end so that the axial extent of insertion of said plug within said other end can be adjusted;
holding means adapted to receive and grip a letter and carried by said plug;
a tension spring positioned within said tubular body and connected between said plug and the outer end of said narrower sleeve of said inner member, said outer tubular body, said inner member and said plug being made from synthetic plastics material;
a scale provided on said narrow sleeve;
said tension spring being adapted to remain in a first, substantially untensioned state when said intermediate sleeve is fully push-fitted within said first end and said plug is secured within said second end to help insure that the characteristics of said spring do not change, and said spring assuming a second, tensioned state when said inner member and writing instrument is partially withdrawn from said body so that the weight of a letter can be measured by gripping said letter with said holding means holding said outer end portion vertically above said holding unit, the extent of extension of said narrower sleeve from said outer body against the tension of said spring indicating the weight of said letter by reference to said scale.

2. An instrument according to claim 1 in which said holding unit comprises a U-shaped member made of resilient plastics material, the two arms of said U-shaped member having their free ends directed away from said tubular body and turned inwardly to face each other and so arranged and positioned as normally to contact each other with a force sufficient to hold a letter or the like pushed between said arms.

3. A writing instrument according to claim 1 further comprising a removable cap fitted over said second end of said outer body to enclose said plug and said holding unit.

* * * * *